United States Patent
Karn et al.

(10) Patent No.: US 9,013,602 B2
(45) Date of Patent: Apr. 21, 2015

(54) DIGITAL CAMERA SYSTEM HAVING A RETAIL MODE

(75) Inventors: Keith Stoll Karn, Avon, NY (US); Frank William Armstrong, Rochester, NY (US); Cheryl J. Kuberka, Penfield, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 439 days.

(21) Appl. No.: 12/983,411

(22) Filed: Jan. 3, 2011

(65) Prior Publication Data
US 2012/0169897 A1 Jul. 5, 2012

(51) Int. Cl.
H04N 5/76 (2006.01)
H04N 5/225 (2006.01)
H04N 9/79 (2006.01)
H04N 5/77 (2006.01)
H04N 21/4223 (2011.01)
H04N 21/433 (2011.01)
H04N 21/4335 (2011.01)

(52) U.S. Cl.
CPC .............. *H04N 9/7921* (2013.01); *H04N 5/772* (2013.01); *H04N 21/4223* (2013.01); *H04N 21/4334* (2013.01); *H04N 21/4335* (2013.01)

(58) Field of Classification Search
USPC ........ 348/207.99, 231.2, 231.1, 231.7, 231.8, 348/231.9, 7.99, 372, 220.1, 231.99
See application file for complete search history.

(56) References Cited

U.S. PATENT DOCUMENTS

| | | | |
|---|---|---|---|
| 3,971,065 A | 7/1976 | Bayer | |
| 4,642,678 A | 2/1987 | Cok | |
| 4,774,574 A | 9/1988 | Daley et al. | |
| 5,189,511 A | 2/1993 | Parulski et al. | |
| 5,493,335 A | 2/1996 | Parulski et al. | |
| 5,652,621 A | 7/1997 | Adams, Jr. et al. | |
| 5,668,597 A | 9/1997 | Parulski et al. | |
| 6,122,411 A * | 9/2000 | Shen et al. | 382/299 |
| 6,192,162 B1 | 2/2001 | Hamilton, Jr. et al. | |
| 6,292,218 B1 | 9/2001 | Parulski et al. | |
| 6,885,395 B1 * | 4/2005 | Rabbani et al. | 348/231.1 |
| 6,934,056 B2 | 8/2005 | Gindele et al. | |
| 7,110,026 B2 * | 9/2006 | Feldis, III | 348/231.6 |
| 7,542,077 B2 | 6/2009 | Miki | |
| 2003/0202104 A1 * | 10/2003 | Werner | 348/207.99 |
| 2004/0075750 A1 * | 4/2004 | Bateman | 348/231.1 |
| 2005/0191729 A1 | 9/2005 | Kaczmarek et al. | |
| 2007/0024931 A1 | 2/2007 | Compton et al. | |

* cited by examiner

Primary Examiner — Ahmed A Berhan (57) ABSTRACT

A digital camera system having a retail mode, comprising: an image sensor; an optical system for forming an image of a scene; a data processing system; a storage memory; and a program memory storing instructions configured to implement a method for automatically deleting captured digital images. The stored instructions include setting the digital camera system to operate in the retail mode in response to detecting a predefined first condition; enabling a user to capture a plurality of digital images, storing any digital images captured while the digital camera system is operating in the retail mode in the storage memory; and automatically deleting at least some of the stored digital images from the storage memory in response to detecting a predefined second condition, wherein any stored digital images that were not captured in the retail mode are not deleted from the storage memory.

17 Claims, 4 Drawing Sheets

FIG. 4

DIGITAL CAMERA SYSTEM HAVING A RETAIL MODE

FIELD OF THE INVENTION

This invention pertains to the field of digital camera systems, and more particularly to a digital camera system where digital images captured in a retail mode are automatically deleted.

BACKGROUND OF THE INVENTION

Many consumers like to evaluate and experiment with digital cameras prior to purchase. Typically, digital cameras are available for evaluation in most major retail stores (e.g., consumer electronic stores, office superstores, wholesale warehouse clubs and other retail outlets) at what is commonly known as a "retail bar." The retail bar displays many different digital camera models from numerous manufacturers providing an opportunity for consumers to quickly assess and choose from the varied assortment. Consumers evaluate digital camera features at the retail bar which may include the digital camera controls, size, weight, color, user interface, picture taking ability and image quality. It is important to enable most, if not all, of the digital camera features at the retail bar in order to provide consumers the ability to fairly assess the digital camera. Most importantly, having a digital camera take a picture at the retail bar should be straightforward, easy and pleasurable for the consumer.

Theft at the retail bar is not uncommon, especially for components not physically attached to the retail bar or digital camera. As such, a removable memory card is generally not inserted into the digital camera at the retail bar. A digital camera without a removable memory card has only limited capacity for storing pictures in the digital camera's internal memory. Likewise, when the digital camera is purchased, a removable memory card is typically not included in the box at the time of camera shipment and must be purchased separately. In most cases, only a few to several dozen pictures or short videos can be captured and stored in the digital camera internal memory. Therefore, the digital camera's internal memory can easily become filled with pictures or videos rendering the picture taking ability of the digital camera to become unavailable until the images are removed from the digital camera either by deletion or moving the images to a computer. For the camera purchaser, this behavior is not objectionable. However, in the retail environment, this behavior is frustrating for consumers when they are evaluating digital cameras and are continually encountering a "memory full" message on the digital camera LCD because of previous consumer evaluations. Consumers are often unable or unwilling to invest the time to clear the digital camera internal memory in order to enable further picture taking.

The principle shortcoming in the above interaction at the retail bar is that the digital camera internal memory becomes filled and prohibits subsequent consumers from readily taking pictures or videos to evaluate the digital camera's features and performance. Requiring consumers to explore the digital camera's user interface in order to determine how to delete images prior to capturing their own evaluation images is not a good consumer experience.

Some recent digital cameras eliminate the possibility of a "memory full" message at the retail bar by either deleting all images stored in internal memory at camera power on/off or simply not saving any captured images in the digital camera's internal memory. However, these two solutions have two drawbacks: (1) pictures that a digital camera purchaser potentially wants to keep are automatically deleted from internal memory and (2) consumers can not experience the digital camera's review functionality if no pictures are ever stored in the digital camera's internal memory. Notably, the KODAK PLAYTOUCH Video Camera, Model Zi10 automatically deletes pictures in the digital camera's internal memory when the internal memory becomes full and the user initiates capture of a new still or video image.

There remains a need for a convenient method to prevent a "memory full" message at the retail bar by automatically deleting pictures from the digital camera internal memory while allowing the digital camera purchaser the opportunity to save captured images without requiring a removable memory card.

SUMMARY OF THE INVENTION

The present invention represents a digital camera system having a retail mode, comprising:
  an image sensor for capturing a digital image;
  an optical system for forming an image of a scene onto the image sensor;
  a data processing system;
  a storage memory for storing captured digital images; and
  a program memory communicatively connected to the data processing system and storing instructions configured to cause the data processing system to implement a method for automatically deleting captured digital images, wherein the instructions include:
    setting the digital camera system to operate in the retail mode in response to detecting a predefined first condition;
    enabling a user to capture a plurality of digital images while the digital camera system is operating in the retail mode;
    storing any digital images captured while the digital camera system is operating in the retail mode in the storage memory, together with an indication that the stored digital images were captured in the retail mode; and
    automatically deleting at least some of the stored digital images from the storage memory in response to detecting a predefined second condition, wherein any stored digital images that were not captured in the retail mode are not deleted from the storage memory.

This invention has the advantage that when the digital camera is operating in a retail environment (especially at a retail bar), consumer images are automatically deleted preventing a condition where the digital camera memory becomes full, prohibiting any further picture taking by subsequent consumers unfamiliar with the digital camera controls.

It has the additional advantage that the retail mode can be entered by a variety of sensor inputs so that all pictures or videos captured in retail mode can be easily identified, for example by using a specified file name convention.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still thither, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the digital camera.

Figure 1:
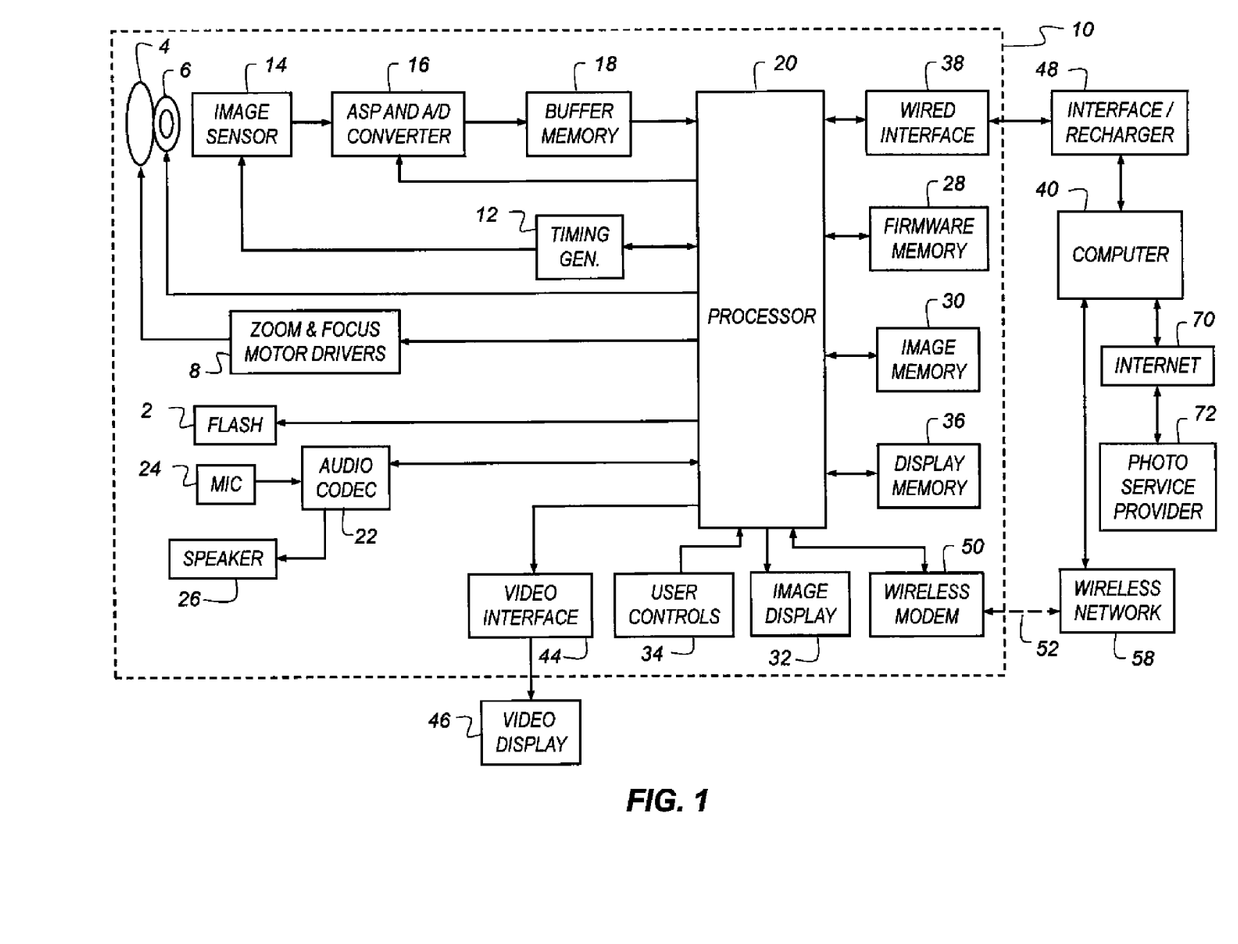
FIG. 1 is a high-level diagram showing the components of a digital camera system.

FIG. 1 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using a wired interface 38 or a wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931 to Compton and Hamilton, entitled "Image sensor with improved light sensitivity," the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate capture of still or video images. The user controls 34 are also used to set user processing preferences, and to choose between various photography modes based on scene type and taking conditions. In some embodiments, various camera settings may be set automatically in response to analysis of preview image data, audio signals, or external signals such as GPS, weather broadcasts, or other available signals.

In some embodiments, when the digital camera is in a still photography mode the above-described preview mode is initiated when the user partially depresses a shutter button, which is one of the user controls 34, and the still image capture mode is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, the user controls 34 can include a means to receive input from the user or an external device via a tethered, wireless, voice activated, visual or other interface. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be used to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-WEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10. In some embodiments, the interface/recharger 48 can be connected directly to an external power source.

The digital camera 10 can include a wireless modem 50, which interfaces over a radio frequency band 52 with a wireless network 58, or in some embodiments with a retail beacon 84. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak EasyShare Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
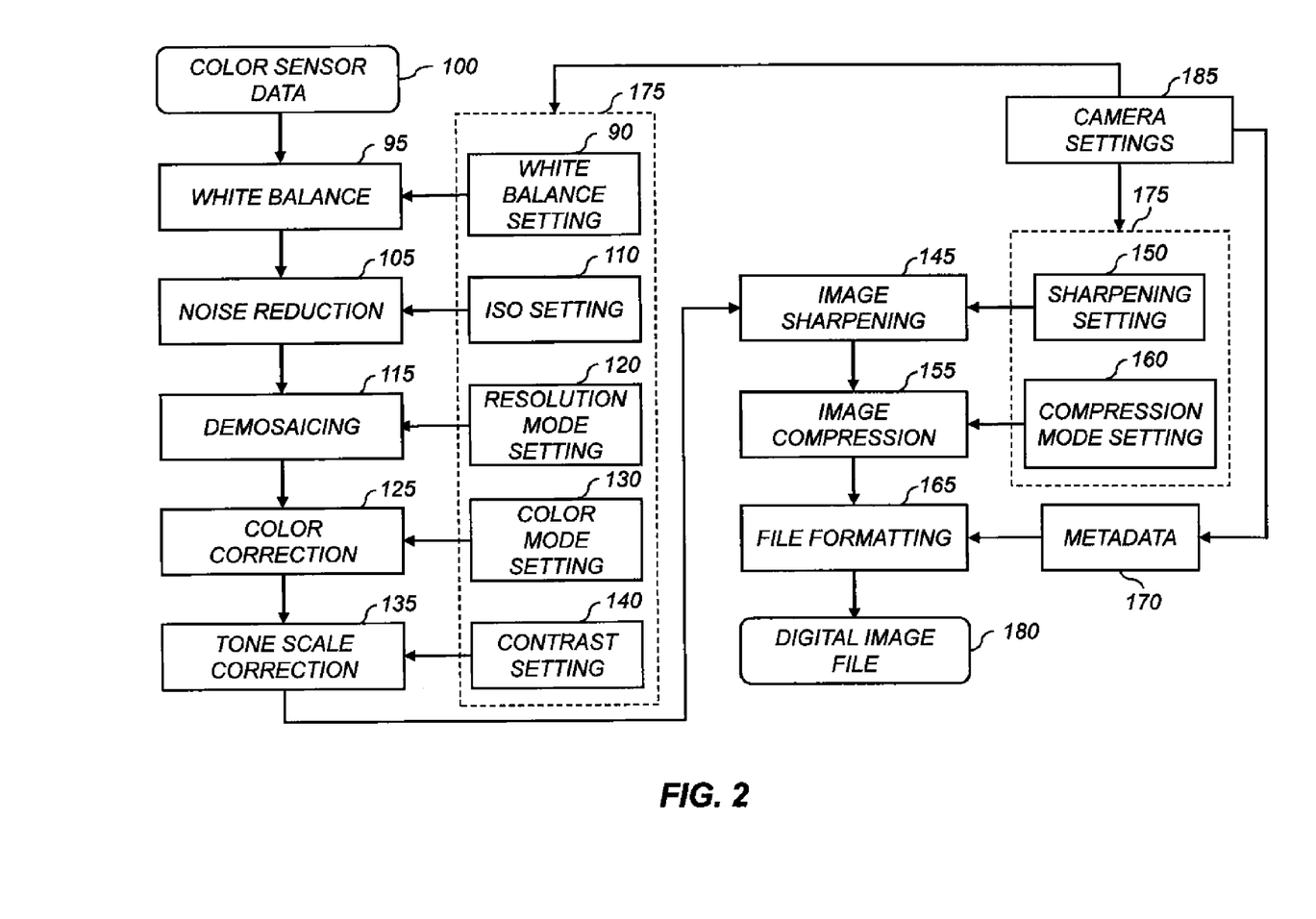
FIG. 2 is a flow diagram depicting typical image processing operations used to process digital images in a digital camera.

FIG. 2 is a flow diagram depicting image processing operations that can be performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Mild, entitled "White balance adjustment device and color identification device", the disclosure of which is herein incorporated by reference. The white balance can be adjusted in response to a white balance setting 90, which can be manually set by a user, or which can be automatically set by the digital camera 10.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (Normal Color Reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (Saturated Color Reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (De-Saturated Color Reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (Monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about various camera settings 185, including the photography mode settings 175.

Figure 3:
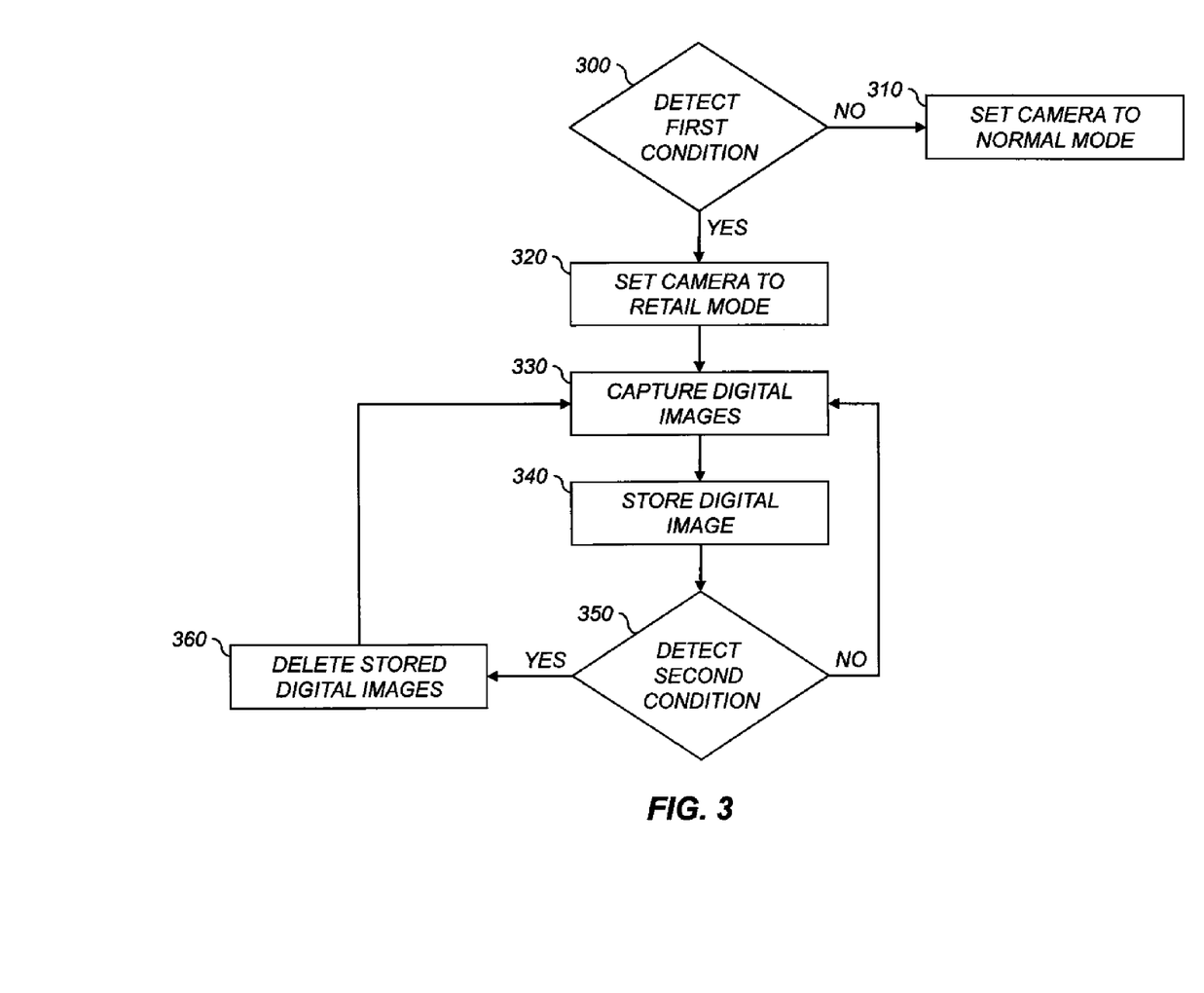
FIG. 3 is a flow diagram depicting a method for deleting digital images captured in a retail mode according to an embodiment of the present invention.

The present invention will now be described with reference to FIG. 3, which is a flow diagram illustrating the operation of the digital camera 10 in a retail mode according to the present invention. The digital camera 10 performs a detect retail mode condition test 300 to determine whether the digital camera 10 is to operate in either a retail mode or a normal mode. If the detect retail mode condition test 300 determines that a specified retail mode condition is not satisfied, the digital camera 10 is set to operate in a normal mode using a set camera to normal mode step 310. The set camera to normal mode step 310 configures the digital camera 10 to operate using normal image capture and camera operation features. When the digital camera 10 operates in normal mode, digital images can be deleted from the image memory 30 using user controls 34 or via the interface/recharger 48 or using any other method known in the art.

When the detect retail mode condition test 300 determines that the retail mode condition is satisfied, the digital camera 10 is set to operate in a retail mode using a set camera to retail mode step 320. The set camera to retail mode step 320 configures the digital camera 10 to operate using the same functionality as in the normal mode with the addition of specific retail mode features. One specific retail mode feature according to the method of the present invention is the ability to automatically delete digital images from image memory 30 in order to avoid the user encountering "memory full" messages during the process of evaluating the digital camera in a retail environment. In alternative embodiments, the set camera to retail mode step 320 additionally includes changing the defaults for one or more user settings, such as setting the digital camera 10 to operate in the lowest resolution image capture size (to increase the number of pictures and videos that can be stored in image memory 30), turning image stabilization on, selecting a high color saturation mode, setting the image display 32 to a high brightness and setting the flash 2 to fire.

In a preferred embodiment, the detect retail mode condition test 300 is performed when the digital camera 10 is powered on. If the retail mode condition is found to be satisfied, then the digital camera 10 is set to retail mode until the next digital camera 10 power cycle causes the retail mode detect condition test 300 to be re-executed. It will be obvious to one skilled in the art that the detect retail mode condition test 300 can also be performed at any time during the digital camera 10 operation, either at regular intervals, or when the camera detects a change in condition. This can result in switching between retail mode and normal mode at any time the digital camera 10 is powered on.

After the set camera to retail mode step 320 is performed, the digital camera 10 captures digital images using a capture digital images step 330 in response to the user operating the user controls 34. Following the capture digital images step 330, the digital camera 10 executes a store digital images step 340 to store the captured digital images in image memory 30, together with an indication that they were captured in the retail mode. There are many different ways that the indication that the digital images were captured in the retail mode can be stored. In a preferred embodiment, the character "R" is inserted in the digital image file name indicating that the digital image was captured in retail mode. In an alternative embodiment, metadata is added to the digital image file providing an indication of whether the digital image was captured in the normal mode or the retail mode. For example, in some embodiments, a metadata tag can be defined using the well-known EXIF digital image file format.

The digital camera 10 performs a detect image deletion condition test 350, to determine if digital images should be deleted from image memory 30. The detect image deletion condition test 350 is used to prevent the user from encountering a "memory full" message when the digital camera 10 is being used in retail mode, which would prevent the user from being able to capture more digital images (still or video). If the detect image deletion condition test 350 determines that the image deletion condition is not met (e.g., that the image memory 30 still has sufficient capacity), the digital camera 10 continues to allow the capture of additional digital images using the capture digital images step 330. When the detect image deletion condition test 350 determines that the image deletion condition is satisfied (e.g., that the image memory 30 has reached a predefined capacity), a delete stored digital images step 360 is performed to delete stored digital images from the image memory 30.

In a preferred embodiment of the detect image deletion condition test 350, the image deletion condition is satisfied when the image memory 30 has room to store less than two still images or less than five seconds of video. In other embodiments, the image deletion condition is satisfied when the image memory 30 is completely filled, or is filled to a certain percentage of its total capacity, or when there is less than a predefined amount of free memory (e.g., 2 MB). It will be obvious to one skilled in the art that other image deletion conditions can also be defined in accordance with the present invention. For example, the detect image deletion condition test 350 can determine whether any images stored in the image memory 30 have been captured in the retail mode, and if so the delete stored digital images step 360 can be executed.

In a preferred embodiment, the detect image deletion condition test 350 is performed when the digital camera 10 is powered down, or alternately when it is powered up. However, it will be obvious to one skilled in the art that the detect image deletion condition test 350 can be performed at any time during retail mode operation (e.g., after each digital image capture operation), thereby enabling the delete stored digital images step 360 to be performed at any time that the detect image deletion condition test 350 determines that the image deletion condition is satisfied.

In some embodiments, the detect image deletion condition test 350 involves detecting that the digital camera 10 has been power cycled. In this case, the delete stored digital images step 360 can be executed each time the digital camera is power cycled, whether or not the image memory 30 has reached a certain capacity. In other embodiments, the detect image deletion condition test 350 can combine multiple test attributes. For example, it can include a memory capacity test attribute and a power cycle test attribute. It will be obvious to one skilled in the art that the detect image deletion condition test 350 can also include other types of test attributes. For example, it can also include determining a time interval since the most recent digital image has been captured.

Figure 4:
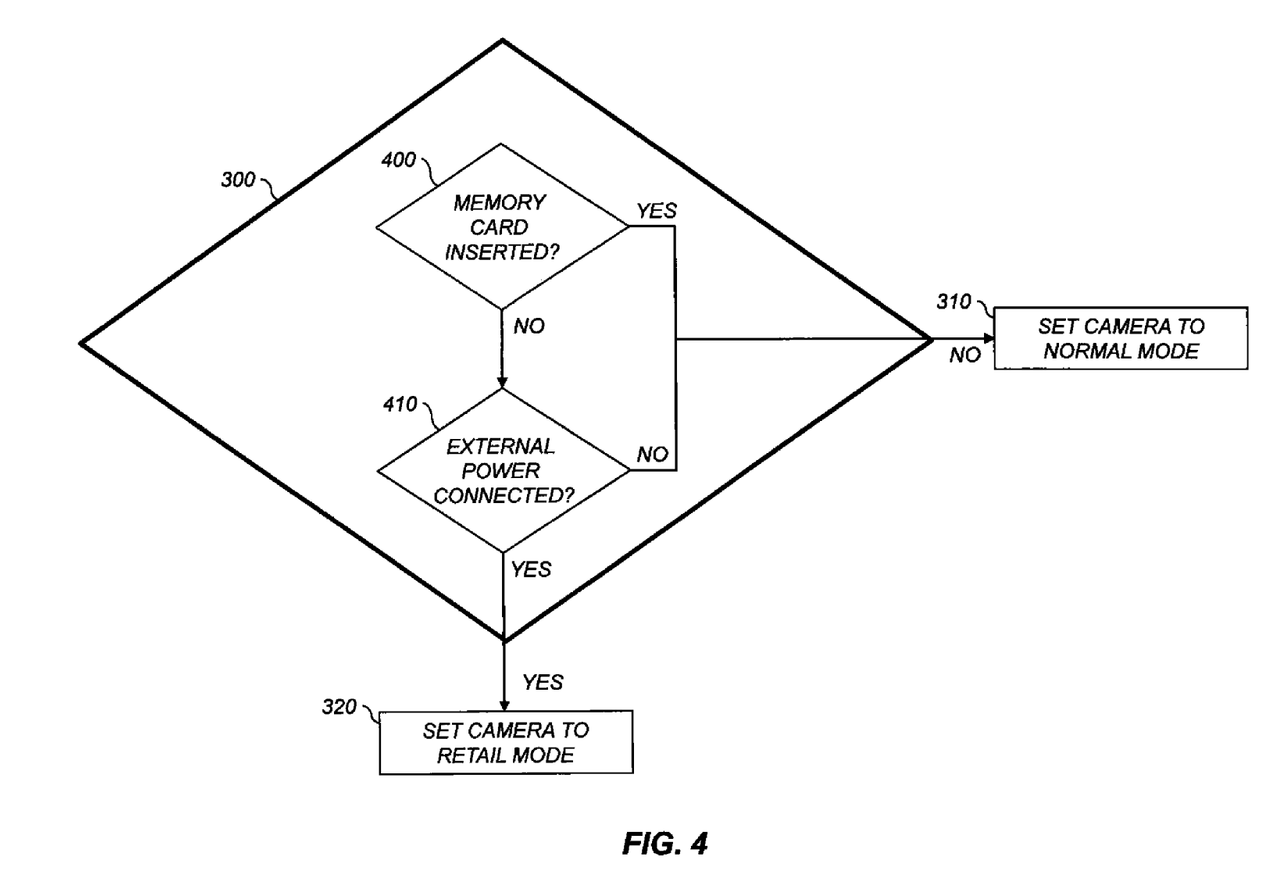
FIG. 4 is a flow diagram depicting additional details of the detect first condition test of FIG. 3 according to an embodiment of the present invention.

FIG. 4 gives a flow diagram showing additional details for the detect retail mode condition test 300 according to a preferred embodiment of the present invention. In this embodiment, the detect retail mode condition test 300 comprises a memory card inserted test 400 and an external power connected test 410. The retail mode condition test is deemed to be true if no removable memory card is present and the digital camera 10 is connected to an external power source.

The memory card inserted test 400 checks the image memory 30 for the presence or absence of a removable memory card. The presence of a removable memory card in image memory 30 by the memory card inserted test 400 indicates that the digital camera 10 is likely not operating in a retail environment. Additionally, the presence of the removable memory card means that the digital camera 10 should have sufficient memory to store many images, and therefore would not require that it be operated in the retail mode. If the memory card inserted test 400 determines that a removable memory card is present, the retail mode condition is deemed to not be satisfied and the set camera to normal mode step 310 is performed.

If the memory card inserted test 400 determines that a removable memory card is not present in image memory 30, the external power connected test 410 is performed. The external power connected test 410 checks the interface/recharger 48 connection to determine the presence or absence of an external power source. If the external power connected test 410 determines that the digital camera 10 has no external power applied (i.e., the digital camera 10 is operating on batteries), it can be assumed that the digital camera is not being operated in a retail environment where digital cameras are normally tethered to an external power supply. In this case, the set camera to normal mode step 310 is called to set the digital camera 10 to operate in the normal mode.

If the external power connected test 410 determines that an external power source is connected to the digital camera 10, the set camera to retail mode step 320 is used to set the digital camera 10 to operate in the retail mode. The digital camera 10 is therefore determining its presence in a retail environment according to the detect retail mode condition test 300 by monitoring the external power source being applied and the absence of a removable memory card in image memory 30.

Several alternative embodiments for the retail mode detect condition test 300 are further described. The retail mode detect condition test 300 embodiments fall into three general testing categories: user interface, electrical (wireless or wired) and mechanical. Each of these general test categories can be used separately or combined with any other test category for the detect retail mode condition test 300. Additionally, one or more test elements within each general test category may be used in the detect retail mode condition test 300.

In one alternative embodiment of the detect retail mode condition test 300 falling into the user interface general test category, a user control 34 is used to allow a user to select between operating the digital camera 10 in the normal mode or the retail mode. In this case, the detect retail mode condition test 300 simply checks the state of the user controls 34. For example, the retail mode can be interactively selected via a camera menu setting on the image display 32. Since it will generally not be desirable for the user to select the retail mode after the camera has been purchased, it may be preferable to require a special sequence of actions on the user controls 34 to unhide the camera menu setting for displaying the retail mode selection on the image display 32. In some embodiments, other types of user controls such as buttons, dials or switches can be used to select the retail mode. To prevent a user from unintentionally entering the retail mode after the digital camera 10 has been purchased, the action required to toggle between retail mode and normal mode preferably involves one or more of the user controls 34 in a predetermined pattern or sequence that a user wouldn't normally do (e.g., simultaneously depressing two or three buttons when the digital camera 10 is powered on). Using a detect retail mode condition test 300 based on user interface settings allows retailers and manufacturers an opportunity to force the digital camera 10 to retail mode for a period of time while the digital camera is being used in the retail environment.

In some embodiments, the detect retail mode condition test 300 includes a test in the wireless electrical test category. For example, a geographical location can be determined using signals obtained from a GPS satellite 80 signal received via GPS receiver 82 using methods well-known in the art. The determined geographical location can then be compared against a database of boundary coordinates for known retail locations stored in the digital camera 10. If it is determined that the geographical location of the digital camera 10 is within the boundary coordinates of a retail location, the digital camera 10 is set to operate in the retail mode by executing the set camera to retail mode step 320, otherwise the digital camera 10 is set to operate in the normal mode by executing the set camera to normal mode step 310. In other embodiments, wireless signals can be received via the wireless modem 50 that contain location information. The wireless signals can be either longer range signals, such as 802.11 or Bluetooth signals or short range signals including RFID. Predefined signals can be provided by a transmitter in the retail location in order to provide an indication that the digital camera 10 is located in a retail location. Similarly, rather than relying on conventional transmitters, the retailer or manufacturer may design a specific wireless retail beacon 84 for informing the digital camera 10 that it is being operated in a retail environment. In this case, the detect retail mode condition test 300 determines whether the digital camera 10 should be set to the retail mode by searching for the presence of a signal from the retail beacon 84. In an alternative embodiment in the electrical wired general test category, the detect retail mode condition test 300 consists of sensing a signal on a wire in an attached cable in the retail environment. The wired signal can be provided by a transmitter located in the retail environment. The wired signal may be on a dedicated wire or multiplexed on an existing wire in the cable connecting the interface/recharger 48 to the digital camera 10.

In some embodiments, the retail mode detect condition test 300 includes a test in the mechanical test category. For example, a mechanical switch can be incorporated either in the retail bar camera mount fixture, retail cable tether or dedicated retail bar dongle. For example, a tab on a cable connector can activate a mechanical switch on the digital camera 10. Cables having the tab can be used to connect the digital camera 10 to the retail bar in the retail environment, thereby providing an indication that the digital camera 10 is being operated at a retail location.

In a preferred embodiment, the delete stored digital images step 360 deletes all stored digital images from image memory 30 that are marked as having been captured in the retail mode without deleting any of the stored digital images that were not marked as being captured in the retail mode. In other embodiments, only a subset of the digital images marked as having been captured in the retail mode are deleted according to a specified algorithm. For example, an algorithm can be specified where a subset of the digital images are deleted according to the rule "delete the oldest digital image first" until a specified amount of image memory is freed up. Alternately, an algorithm can be specified where a subset of the digital images are deleted that were captured more than a specified time interval before the current time. For example, since a customer will typically interact with a digital camera for only a few minutes, the algorithm could be specified to delete digital images that were captured more than an hour before the current time.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
26 speaker
28 firmware memory
30 image memory
32 image display
34 user controls
36 display memory
38 wired interface
40 computer
44 video interface
46 video display
48 interface/recharger
50 wireless modem
52 radio frequency band
58 wireless network
70 Internet
72 photo service provider
80 GPS Satellites
82 GPS Receiver
84 retail beacon
90 white balance setting
95 white balance step
100 color sensor data
105 noise reduction step
110 ISO setting
115 demosaicing step
120 resolution mode setting
125 color correction step
130 color mode setting 135 tone scale correction step
140 contrast setting
145 image sharpening step
150 sharpening setting
155 image compression step
160 compression mode setting
165 file formatting step
170 metadata
175 photography mode settings
180 digital image file
185 camera settings
300 detect retail mode condition test
310 set camera to normal mode step
320 set camera to retail mode step
330 capture digital images step
340 store digital images step
350 detect image deletion condition test
360 delete stored digital images step
400 memory card inserted test
410 external power connected test

The invention claimed is:

1. A digital camera system comprising:
an image sensor configured to capture a digital image;
an optical system configured to form an image of a scene onto the image sensor;
a data processing system;
a storage memory configured to store captured digital images; and
a program memory communicatively connected to the data processing system and storing instructions configured to cause the data processing system to implement a method for automatically deleting captured digital images, wherein the instructions include:
  instructions to set the digital camera system to operate in a retail mode in response to detecting a predefined first condition;
  instructions to enable capture of a plurality of digital images while the digital camera system is operating in the retail mode;
  instructions to store in the storage memory digital images captured while the digital camera system is operating in the retail mode and an indication that the stored digital images were captured in the retail mode; and
instructions to automatically delete at least one of the stored digital images from the storage memory in response to detecting a predefined second condition, wherein stored digital images that were not captured in the retail mode are not deleted from the storage memory, wherein the digital camera system further includes:
  a memory card receptacle configured to receive a removable memory card that is configured to store captured digital images; and
  a power supply connector configured to supply external power to the digital camera system,
  wherein the predefined first condition comprises a determination that no removable memory card is inserted into the memory card receptacle and a determination that external power is supplied to the digital camera system via the power supply connector.

2. The digital camera system of claim 1, wherein the digital camera system further includes a user interface, and wherein the predefined first condition comprises a selection of a retail mode setting using the user interface.

3. The digital camera system of claim 1, wherein the digital camera system further includes a global positioning system receiver, and wherein the predefined first condition comprises a determination that a location of the digital camera system corresponds to a predefined location.

4. The digital camera system of claim 1, wherein the predefined first condition comprises at least one of reception of an electrical signal transmitted over a wire connected to a signal transmitter located at a retail location, reception of a wireless signal from a wireless signal transmitter located at a retail location, or activation of a mechanical sensor configured to indicate that the digital camera system is being operated at a retail location.

5. The digital camera system of claim 1, wherein the stored digital images are stored in the storage memory as digital image files, and wherein the indication that the digital images were captured in the retail mode is provided as metadata included in the digital image files.

6. The digital camera system of claim 1, wherein the stored digital images are stored in the storage memory as digital image files, and wherein a naming convention used to name the digital image files provides the indication that the stored digital images were captured in the retail mode.

7. The digital camera system of claim 1, wherein the predefined second condition includes detecting that the storage memory has been filled to a predefined capacity.

8. The digital camera system of claim 7, wherein the predefined capacity is reached when the storage memory has capacity to store less than a predefined number of additional digital images.

9. The digital camera system of claim 7, wherein the predefined capacity is reached when the storage memory does not have a capacity to store any additional digital images.

10. The digital camera system of claim 1, wherein the predefined second condition includes a determination that the digital camera has been power cycled.

11. The digital camera system of claim 1, wherein the instructions to automatically delete at least one of the stored digital images from the storage memory comprise instructions to automatically delete all of the stored digital images that were captured in the retail mode in response to detecting the predefined second condition.

12. The digital camera system of claim 1, wherein the instructions to automatically delete at least one of the stored digital images from the storage memory comprise instructions to automatically delete an oldest stored digital image that was captured in the retail mode before deleting a new stored digital image.

13. The digital camera system of claim 1, wherein the digital images comprise at least one of digital still images or digital video images.

14. The digital camera system of claim 1, wherein the instructions to automatically delete at least one of the stored digital images comprise instructions to automatically delete an entirety of the at least one of the stored digital images.

15. The digital camera system of claim 1, wherein the retail mode comprises a first image capture mode of the digital camera system, wherein the program memory further stores instructions to enable capture of a second plurality of digital images while the digital camera system is operating in a second image capture mode of the digital camera system, and wherein the stored digital images that were not captured in the retail mode were captured via the second image capture mode.

16. A method comprising:
in response to detecting a predefined first condition, enabling, by the digital camera system, capture of a plurality of digital images in a retail mode;

storing in a storage memory, by the digital camera system, digital images captured while the digital camera system is operating in the retail mode; and automatically deleting, by the digital camera system, at least one of the stored digital images from the storage memory in response to detecting a predefined second condition while retaining any stored digital images that were not captured in the retail mode, wherein the predefined first condition comprises a determination by the digital camera system that no removable memory card is inserted into a memory card receptacle of the digital camera system and a determination by the digital camera system that external power is supplied to the digital camera system via a power supply connector.

17. A non-transitory computer-readable medium having instructions stored thereon, the instructions comprising:

instructions to, in response to detecting a predefined first condition, enable capture of a plurality of digital images in a retail mode;

instructions to store, in a storage memory, digital images captured while the digital camera system is operating in the retail mode; and instructions to automatically delete at least one of the stored digital images from the storage memory in response to detecting a predefined second condition while retaining any stored digital images that were not captured in the retail mode,.

wherein the predefined first condition comprises a determination that no removable memory card is inserted into the memory card receptacle and a determination that external power is supplied via a power supply connector.

* * * * *